US012648039B2

(12) United States Patent
Xu et al.

(10) Patent No.: US 12,648,039 B2
(45) Date of Patent: Jun. 2, 2026

(54) METHOD AND APPARATUS FOR HANDLING QOE MANAGEMENT IN DUAL CONNECTIVITY IN A WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 18/286,930

(22) PCT Filed: Jan. 17, 2022

(86) PCT No.: PCT/KR2022/000802
§ 371 (c)(1),
(2) Date: Oct. 13, 2023

(87) PCT Pub. No.: WO2022/220377
PCT Pub. Date: Oct. 20, 2022

(65) Prior Publication Data
US 2024/0196459 A1 Jun. 13, 2024

(30) Foreign Application Priority Data
Apr. 13, 2021 (KR) ........................ 10-2021-0047910

(51) Int. Cl.
*H04L 12/00* (2006.01)
*H04L 41/5009* (2022.01)
(Continued)

(52) U.S. Cl.
CPC ......... *H04W 76/15* (2018.02); *H04L 41/5009* (2013.01); *H04L 41/5067* (2013.01)

(58) Field of Classification Search
CPC .. H04W 76/15; H04W 28/24; H04L 41/5009; H04L 41/5067; H04L 43/06; H04L 41/147; H04L 41/16
(Continued)

(56) References Cited

U.S. PATENT DOCUMENTS

2004/0105415 A1* 6/2004 Fujiwara ............... H04W 24/00
370/338
2005/0014510 A1* 1/2005 Jeon ........................ H04L 45/00
455/445
(Continued)

FOREIGN PATENT DOCUMENTS

WO WO-2013141625 A1 * 9/2013 ............. H04L 67/12
WO WO 2020/150952 7/2020
(Continued)

OTHER PUBLICATIONS

3GPP TR 38.890 V17.0.0 (Apr. 2021), 3rd Generation Partnership Project Technical Specification Group Radio Access Network, Study on NR QoE (Quality of Experience) management and optimizations for diverse services (Release 17), Apr. 2021, 18 pages.
(Continued)

*Primary Examiner* — Frantz Coby
(74) *Attorney, Agent, or Firm* — Fish & Richardson P.C.

(57) ABSTRACT
A method and apparatus for handling QoE management in dual connectivity in a wireless communication system is provided. A secondary node receives, from a master node, a request message for a Quality of Experience (QoE) management for a UE. A secondary node determines whether to perform the QoE management for the UE. A secondary node transmits, to the master node, a response message based on the determination.

13 Claims, 11 Drawing Sheets receiving, from a master node, a request message for a Quality of Experience (QoE) management for a UE — S901 determining whether to perform the QoE management for the UE — S902 transmitting, to the master node, a response message based on the determination — S903

(51) Int. Cl.
    *H04L 41/5067*         (2022.01)
    *H04W 76/15*          (2018.01)

(58) Field of Classification Search
    USPC ......................................................... 370/328
    See application file for complete search history.

(56)                        References Cited

U.S. PATENT DOCUMENTS

| | | | |
|---|---|---|---|
| 2018/0234876 A1* | 8/2018 | Jheng | H04L 47/2441 |
| 2024/0214832 A1* | 6/2024 | Byun | H04L 41/5009 |

FOREIGN PATENT DOCUMENTS

| | | |
|---|---|---|
| WO | WO 2021/012213 | 1/2021 |
| WO | 2021/023280 A1 | 2/2021 |
| WO | WO-2021122271 A1 * | 6/2021 ............. H04W 4/24 |
| WO | 2022/005376 A1 | 1/2022 |
| WO | 2022/225142 A1 | 10/2022 |

OTHER PUBLICATIONS

Ericsson, "pCR for TR 38.890: Way Forward on Remaining Issues in NR QoE Management," 3GPP TSG-RAN WG3 Meeting #110-e, R3-206399, Online, Nov. 2-12, 2020, 8 pages.
Huawei, HiSilicon, "QoE measurement handling at RAN overload," 3GPP TSG RAN Meeting #113bis-e, R2-2103911, Online, Apr. 12-20, 2021, 9 pages.
International Search Report and Written Opinion in Application No. PCT/KR2022/000802, mailed on Apr. 28, 2022, 4 pages.
Extended European Search Report in European Appln. No. 22788235.4, mailed on Jan. 31, 2025, 12 pages.
Huawei, HiSilicon, "Discussion for NR QoE," R2-2010180, 3GPP TSG-RAN WG2 Meeting #112-e, Online, Nov. 2-13, 2020, 3 pages.

* cited by examiner

Figure 3:
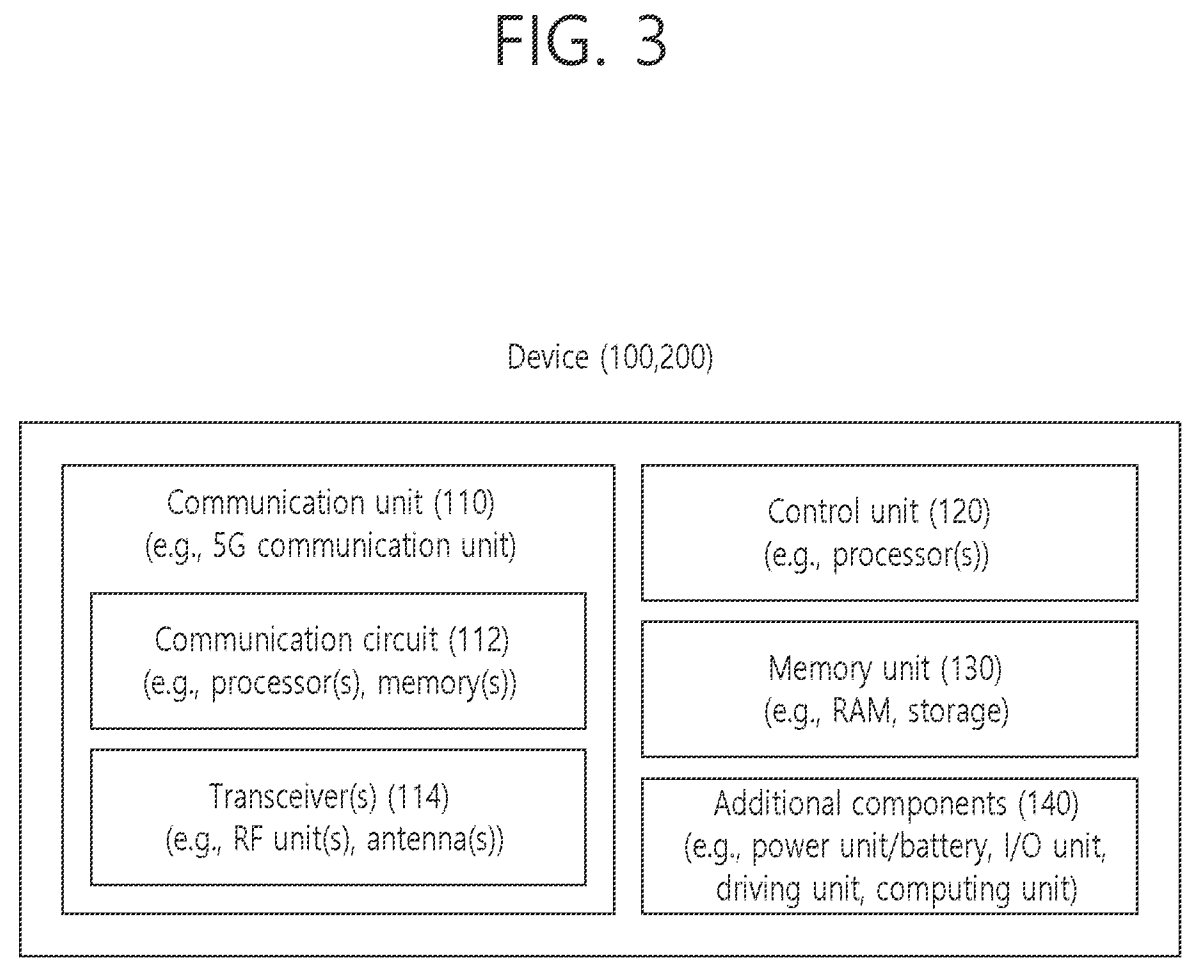

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

Control Plane

Radio
Network
Layer

F1AP

SCTP

Transport
Network
Layer

IP

Data link layer

Physical layer receiving, from a master node, a request message for
a Quality of Experience (QoE) management for a UE
~S901 determining whether to perform
the QoE management for the UE
~S902 transmitting, to the master node,
a response message based on the determination
~S903

Figure 10:
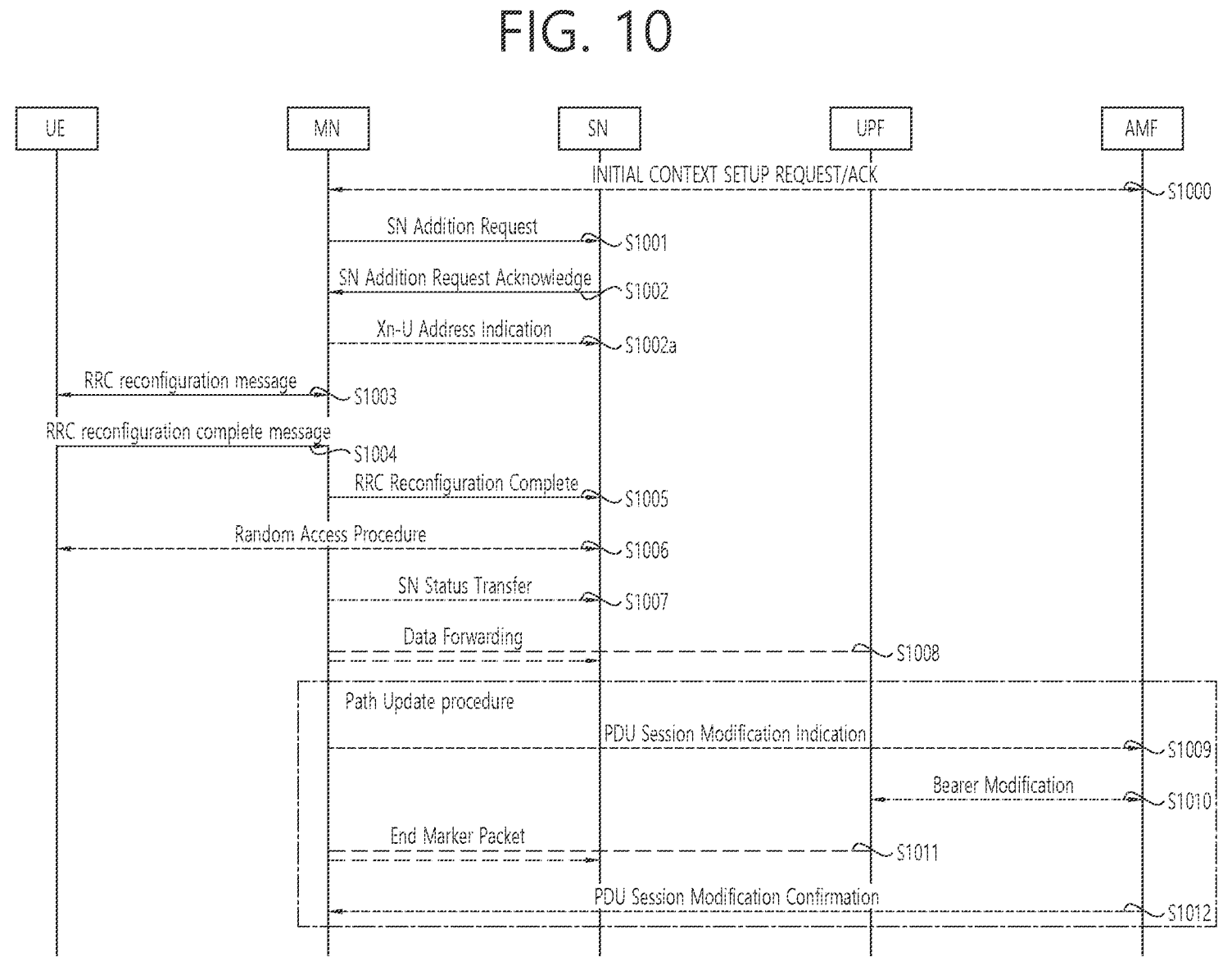

UPF

AMF

INITIAL CONTEXT SETUP REQUEST/ACK — S1000

SN Addition Request — S1001

SN Addition Request Acknowledge — S1002

Xn-U Address indication — S1002a

RRC reconfiguration message — S1003

RRC reconfiguration complete message — S1004

RRC Reconfiguration Complete — S1005

Random Access Procedure

SN Status Transfer — S1006

Data Forwarding — S1007

S1008

Path Update procedure

PDU Session Modification Indication — S1009

Bearer Modification — S1010

End Marker Packet — S1011

PDU Session Modification Confirmation — S1012

FIG. 11

METHOD AND APPARATUS FOR HANDLING QOE MANAGEMENT IN DUAL CONNECTIVITY IN A WIRELESS COMMUNICATION SYSTEM

CROSS-REFERENCE TO RELATED APPLICATIONS

This application is a National Stage application under 35 U.S.C. § 371 of International Application No. PCT/KR2022/000802, filed on Jan. 17, 2022, which claims the benefit of Korean Patent Application No. 10-2021-0047910, filed on Apr. 13, 2021. The disclosures of the prior applications are incorporated by reference in their entirety.

TECHNICAL FIELD

The present disclosure relates to a method and apparatus for handling QoE management in dual connectivity in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In 5G network, RAN node needs to support adaptive QoE management mechanism for the various services. The QoE services may also be supported for MR-DC, which is important feature in 5G network.

However, for support of MR-DC, flexible QoE configuration/reporting may be done by either the MN or the SN. If both configure the UE on QoE, the conflict may happen. Thus the negotiation or coordination is needed between MN and SN.

Therefore, studies for handling QoE management in dual connectivity in a wireless communication system are needed.

In an aspect, a method performed by a secondary node in a wireless communication system is provided. A secondary node receives, from a master node, a request message for a Quality of Experience (QoE) management for a UE. A secondary node determines whether to perform the QoE management for the UE. A secondary node transmits, to the master node, a response message based on the determination.

In another aspect, an apparatus for implementing the above method is provided.

The present disclosure may have various advantageous effects.

According to some embodiments of the present disclosure, a RAN node could efficiently handle QoE management in dual connectivity.

For example, either a master node or a secondary node could perform QoE configuration and/or QoE reporting. Therefore, the conflict problem for deciding which node is in charge the QoE service can be solved. This will be helpful for supporting the QoE services in the important MR-DC deployment scenarios.

For example, the user experience for various services (for example, AR/VR, URLLC) could be enhanced.

According to some embodiments of the present disclosure, the wireless communication system could support QoE management efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 10 shows an example of a method for a SN Addition Procedure for QoE Service in a wireless communication system.

FIG. 11 shows an example of a SN Modification procedure for QoE Service in a wireless communication system.

DETAILED DESCRIPTION

Figure 4:
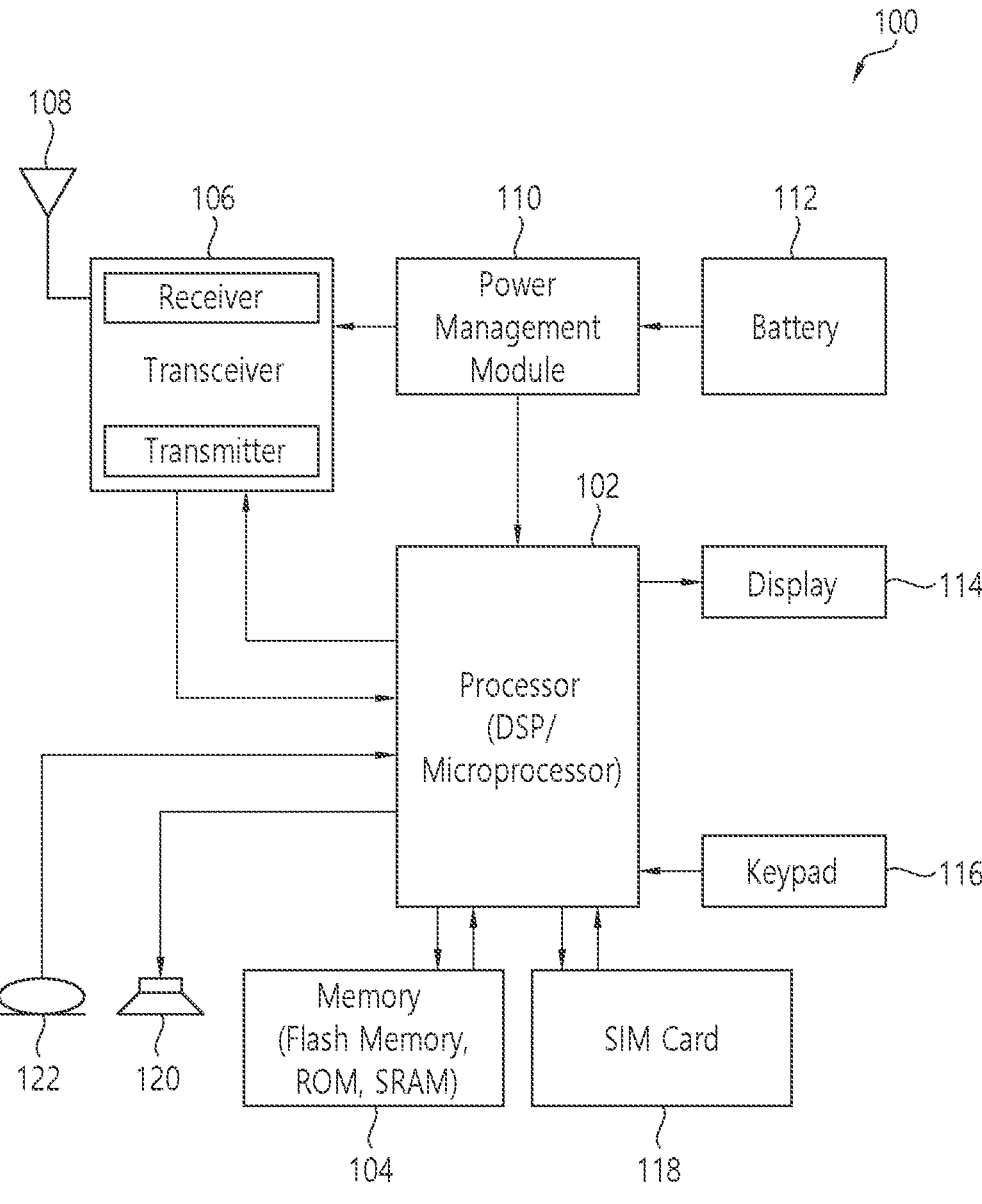
FIG. 4 shows an example of UE to which implementations of the present disclosure is applied.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
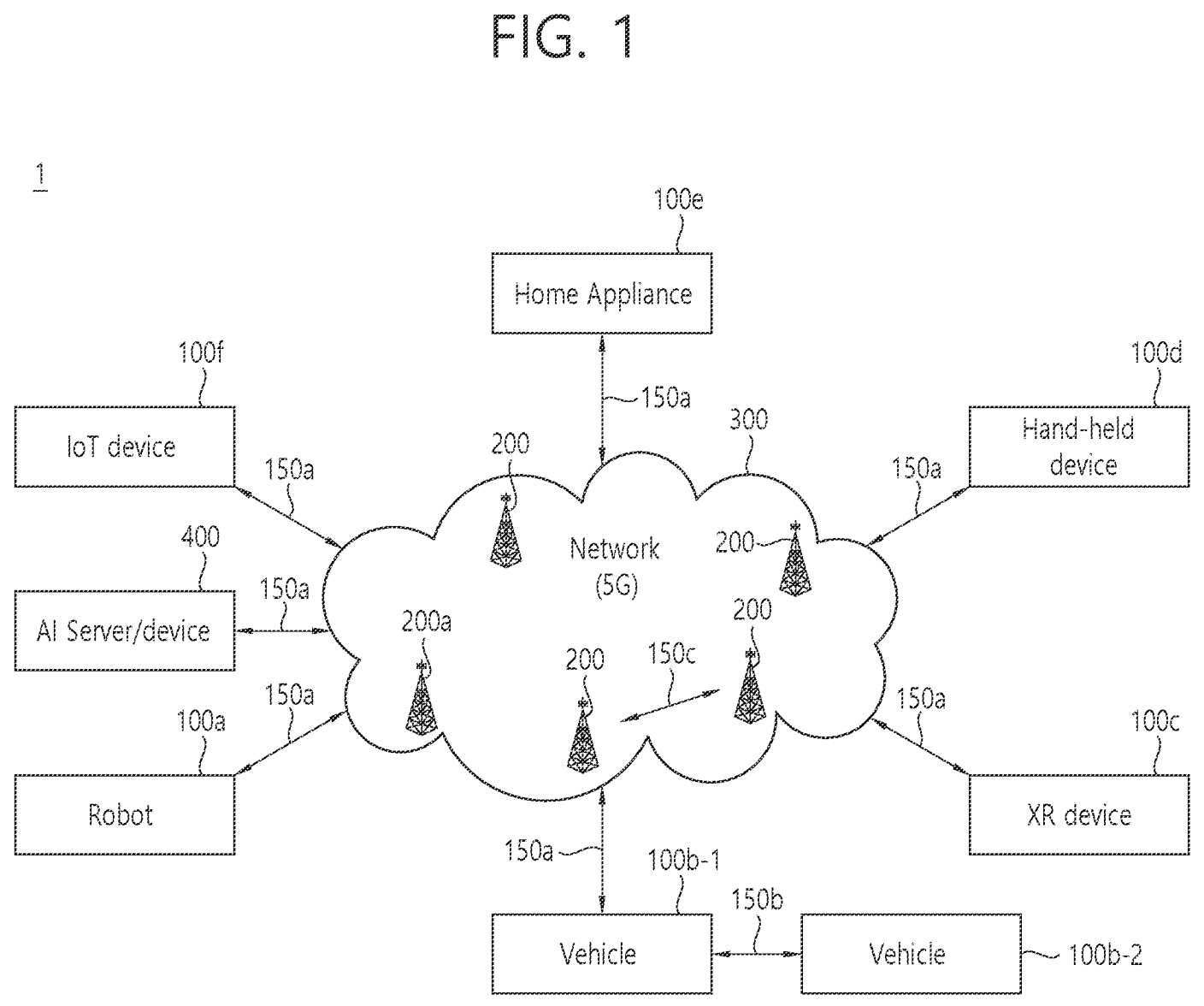

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 KHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHZ, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
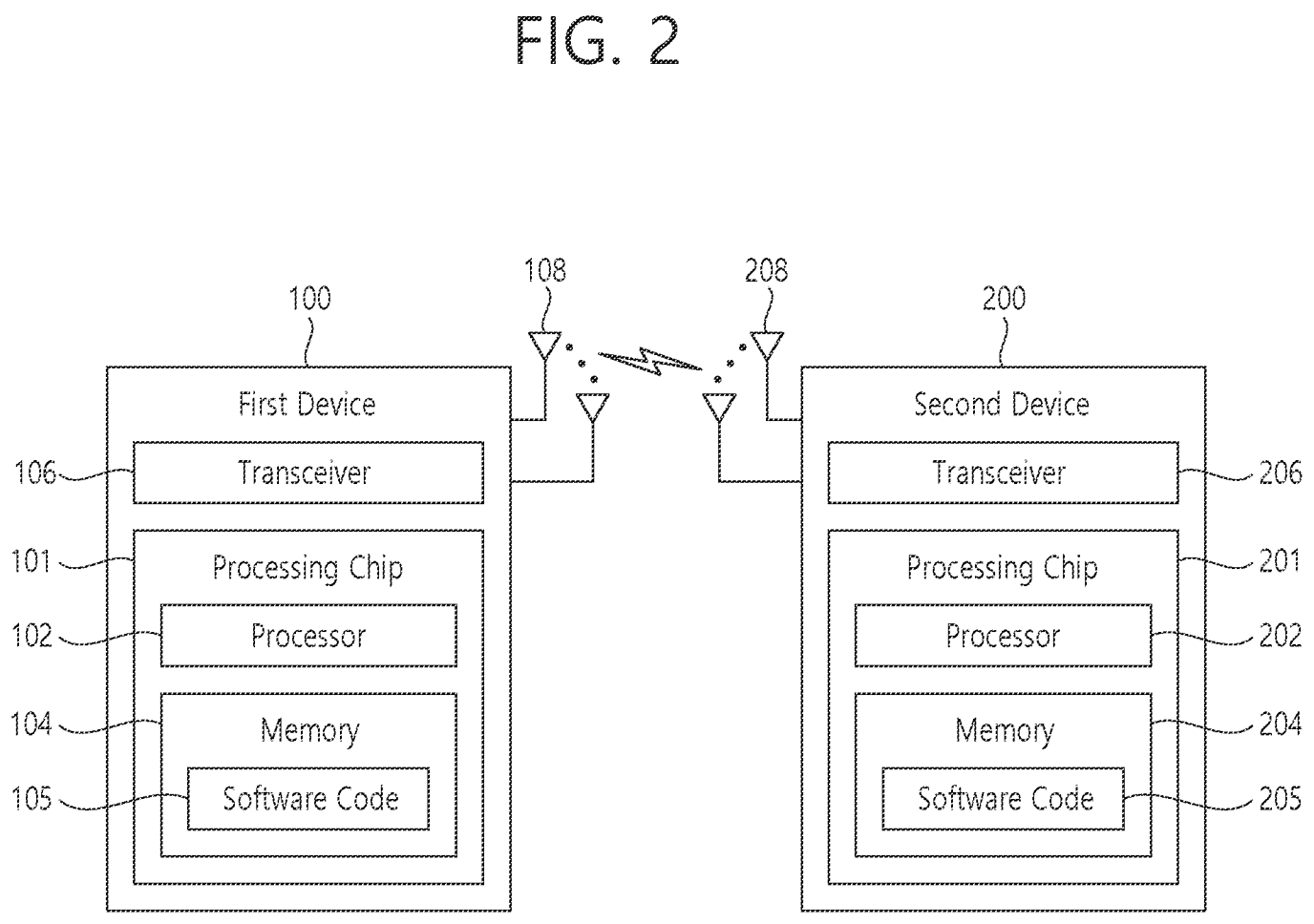

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
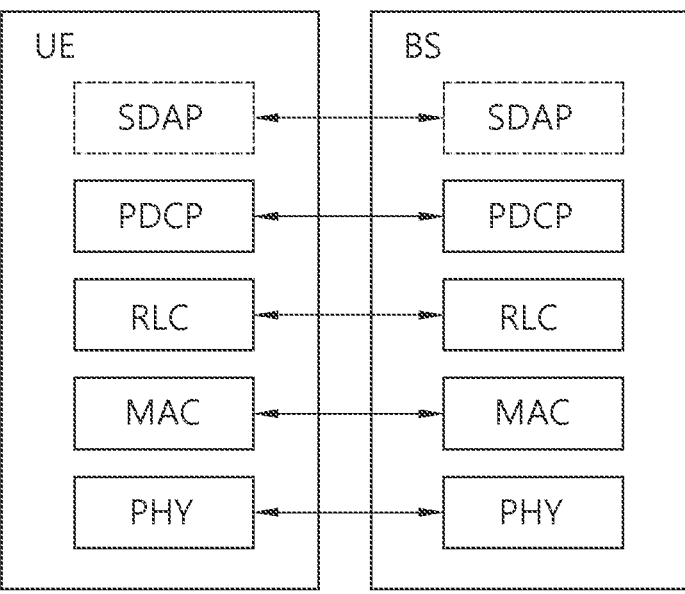
FIGS. 5 and 6 show an example of protocol stacks in a 3GPP based wireless communication system to which implementations of the present disclosure is applied.
Figure 6:
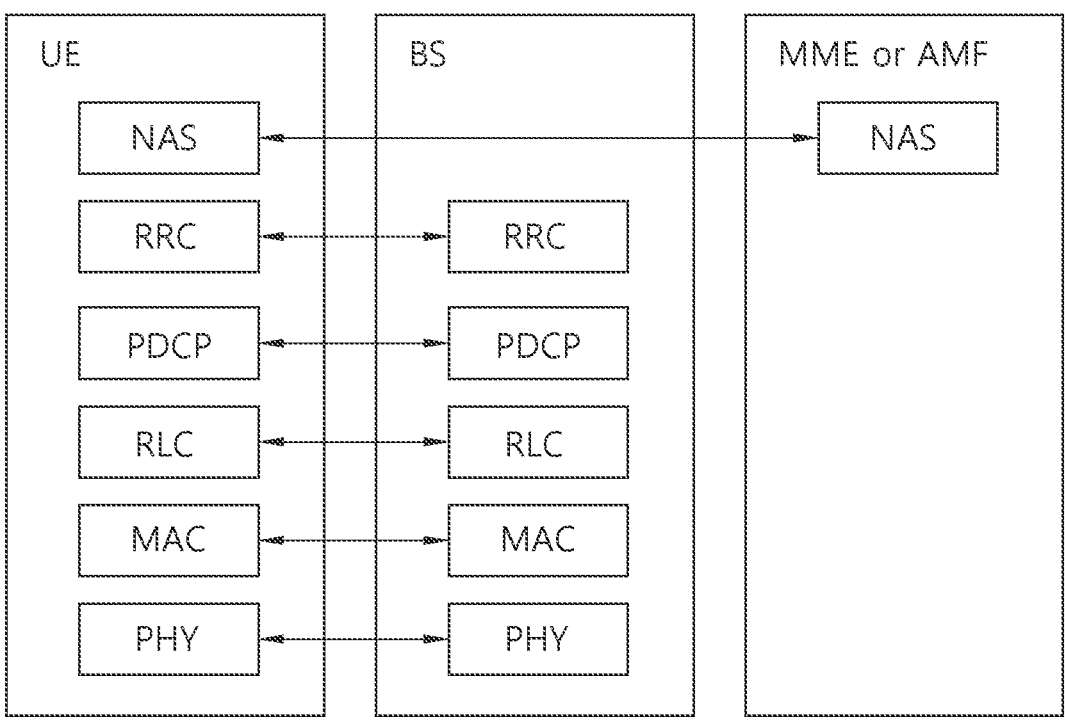

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels: multiplexing/de-multiplexing of MAC SDUs belonging to one or different logical channels into/from transport blocks (TB) delivered to/from the physical layer on transport channels: scheduling information reporting; error correction through hybrid automatic repeat request (HARQ) (one HARQ entity per cell in case of carrier aggregation (CA)): priority handling between UEs by means of dynamic scheduling: priority handling between logical channels of one UE by means of logical channel prioritization: padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH): BCCH can be mapped to downlink shared channel (DL-SCH): PCCH can be mapped to paging channel (PCH): CCCH can be mapped to DL-SCH: DCCH can be mapped to DL-SCH: and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment: protocol error detection (AM only).

In the 3GPP NR system, the main services and functions of the PDCP sublayer for the user plane include: sequence numbering: header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer: marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs): mobility functions (including: handover and context transfer. UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
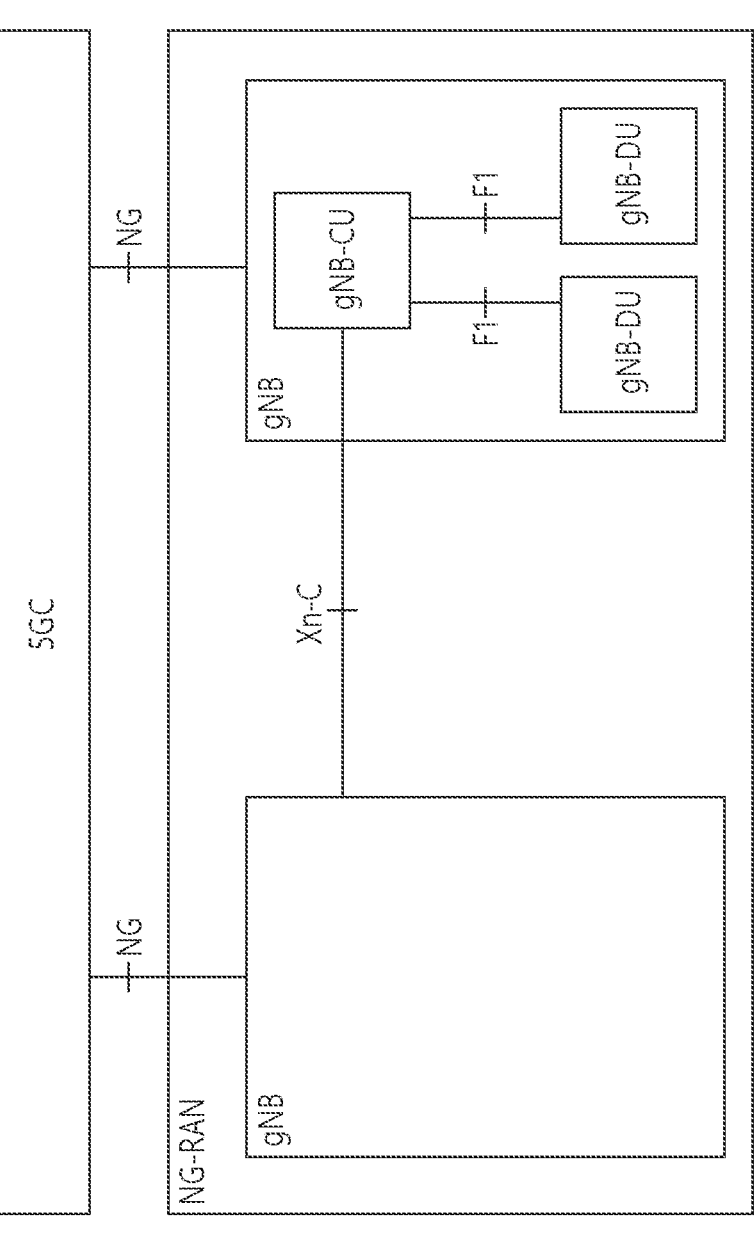
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Figure 8:
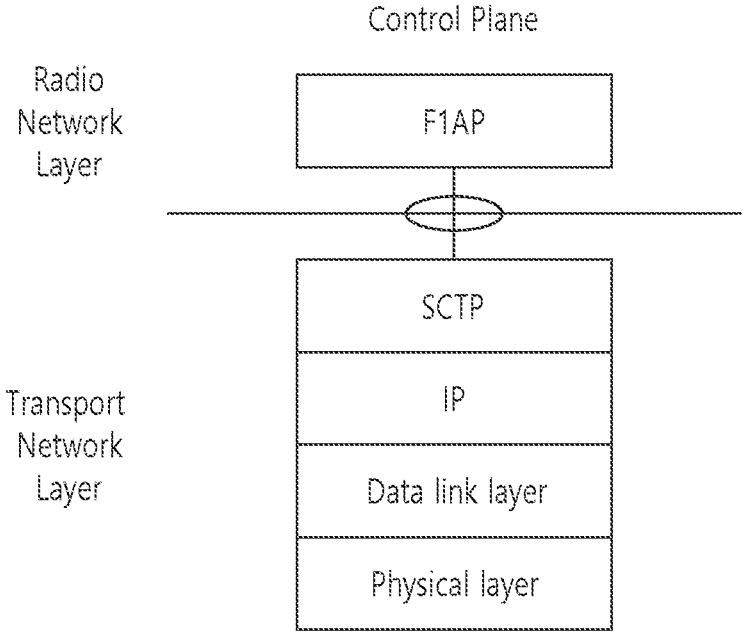
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

In Universal Terrestrial Radio Access Network UTRAN and Evolved-UTRAN (E-UTRAN), Quality of Experience (QoE) Measurement Collection for streaming services have been specified.

NR is designed for different kinds of services and scenarios, and operators have strong demand to optimize their network and provide better user experiences with various types of services.

QoE management in 5G will not just collect the experience parameters of streaming services but also consider the typical performance requirements of diverse services (for example, AR/VR and URLLC). Based on requirements of services, adaptive QoE management schemes that enable network intelligent optimization to satisfy user experience for diverse services are studied.

5G network will provide service for various kinds of vertical industries and various kinds of users, the 5QI service requirements may not enough to provide good user experience for all the user requirements. Thus in the 5G network, RAN also needs to collect the user KPI information, for example, E2E reliability statistic indicator, etc.

Different types of UEs have different QoE requirements, resource allocation should be based on the UE's requirements. QoE parameters can be defined as UE-specific and service related. In addition, QoE can be used as a criteria to evaluate network quality.

During NR QoE SI phase, it needs to study the generic mechanisms of trigger, configuration and reporting for QoE measurement collection, including all relevant entities (for example, UE, network entities). In addition, the mechanisms need to support 5G existing services as well as scalable support for new emerging services in the future.

Meanwhile, in 5G network, RAN node needs to support adaptive QoE management mechanism for the various services. The QoE services may also be supported for MR-DC, which is important feature in 5G network.

However, for support of MR-DC, flexible QoE configuration/reporting may be done by either the MN or the SN. If both configure the UE on QoE, the conflict may happen. Thus the negotiation or coordination is needed between MN and SN.

Therefore, studies for handling QoE management in dual connectivity in a wireless communication system are needed.

Hereinafter, a method for handling QoE management in dual connectivity in a wireless communication system, according to some embodiments of the present disclosure, will be described.

Figure 9:
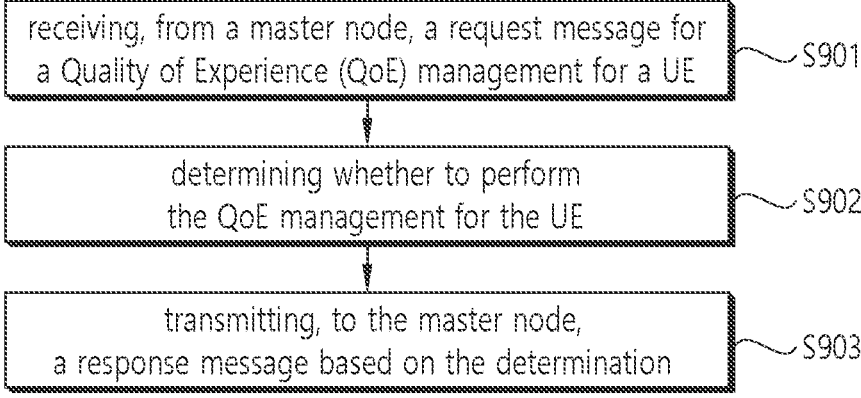
FIG. 9 shows an example of a method for handling QoE management in dual connectivity in a wireless communication system, according to some embodiments of the present disclosure.

FIG. 9 shows an example of a method for handling QoE management in dual connectivity in a wireless communication system, according to some embodiments of the present disclosure.

In particular, FIG. 9 shows an example of a method performed by a secondary node in a wireless communication system.

In step S901, the secondary node may receive, from a master node, a request message for a Quality of Experience (QoE) management for a UE.

The request message includes information on parameters related to the QoE management.

The request message may include at least one of (1) application layer measurement configuration parameters for QoE, (2) information on QoE areas, (3) information on a QoE service (for example, QoE service type), and/or (4) a QoE server IP address. The information on the QoE area may include at least one of (1) a cell list, (2) a Tracking Area Identity (TAI) list, and/or (3) a Public Land Mobile Network (PLMN) list.

For example, based on the signalling load or other situation of the master node, the master node may decide to let the secondary node help to perform some QoE services for the UE. For example, the master node may request the secondary node to perform some part of QoE managements among multiple QoE managements.

For example, the request message may includes the indication(s) of requesting QoE configuration and/or QoE reporting in SN (for example, via existing or other SRB). The secondary node may take it into account to configure radio resources for QoE configuration and/or QoE reporting via existing or other SRB.

In step S902, the secondary node may determine whether to perform the QoE management for the UE.

For example, based on the signalling load or other situation of the secondary node, the secondary node could decide whether to accept the request on the QoE management for the US.

In step S903, the secondary node may transmit, to the master node, a response message based on the determination.

The response message includes information informing whether to perform the QoE management for the UE.

For example, the response message may include the response indication(s) on whether the requested QoE configuration and/or QoE reporting in the secondary node (for example, via existing or other SRB) is accepted or not.

If the secondary node accepts the request, the requested QoE configuration and QoE reporting will be done in the secondary node. The response message may include the indication for the master node. In addition, the secondary node may include the indication/information in the RRC context for the UE. Therefore, the secondary node could let UE know that QoE configuration and/or QoE reporting is directly performed from/to SN.

Then, the master node may forward the received information (that is, the indication/information included in the RRC context to let UE know that QoE configuration and/or QoE reporting can be directly from/to SN) to UE.

In other words, the response message may include a radio resource control (RRC) context including information informing that the QoE management for the UE is directly performed by the secondary node, based on determining to perform the QoE management.

In this case, the RRC context may be forwarded to the UE via the master node.

According to some embodiments of the present disclosure, the secondary node may perform the QoE management, based on determining to perform the QoE management.

The secondary node may transmit, directly to the UE, a QoE configuration. The secondary node may receive, directly from the UE, a QoE reporting.

For example, the QoE management may be performed by one signalling radio bearer (SRB).

According to some embodiments of the present disclosure, the secondary node may receive, from the master node, a release request message for the QoE management for the UE on releasing the previous requested QoE configuration and QoE reporting.

For example, based on the signalling load or other situation of the master node, the master node may decide to release the QoE services in the secondary node for the UE.

The release request message may include the indication(s) of releasing the previous requested QoE configuration and/or QoE reporting in the secondary node (for example, existing or other SRB). The secondary node may use the received information to release the radio resources for QoE configuration and/or QoE reporting via existing or other SRB.

The secondary node may transmit, to the master node, a release response message informing whether the releasing of the QoE management for the UE is done or not.

For example, the release response message may include the response on whether the releasing of the previous requested QoE configuration and/or QoE reporting in the secondary node (for example, existing or other SRB) is done or not.

For example, the release indication may be sent to the UE. That is, the secondary node may let UE know that QoE configuration and/or QoE reporting is to be released in the secondary node. The information can be container format from the secondary node or set by the master node.

If the secondary node does not accept the request, the secondary node may include the indication to tell the master node that the requested QoE configuration and/or QoE reporting in SN is not accepted. In this case, the master node may need to perform QoE configuration and/or QoE reporting by itself using the existing or other SRB.

Then, the MN may decide to do the QoE management by itself. The master node may include the measConfigAppLayerContainer in the RRC context. The measConfigAppLayerContainer may contain configuration of application layer measurements, and also service type. QoE areas (cell list, TAI list, and/or PLMN list) may be also included.

According to some embodiments of the present disclosure, the request message may be a secondary node (SN) addition request message and the response message may be an SN addition request acknowledgement message. That is, the request message and the response message may be received and/or transmitted in an SN addition procedure.

According to some embodiments of the present disclosure, the request message may be a secondary node (SN) modification request message and the response message may be an SN modification request acknowledgement message. That is, the request message and the response message may be received and/or transmitted in an SN modification procedure.

According to some embodiments of the present disclosure, the UE may be in communication with at least one of a user equipment, a network, or an autonomous vehicle other than the UE.

Hereinafter, the SN Addition procedure and the SN Modification procedure for handling QoE management may be described. The scheme on how to decide in MN and trigger the signalling to request SN to do configuration and reporting on QoE service may be proposed. In addition, MN could also decide when and how to release the configuration in SN.

FIG. 10 shows an example of a method for a SN Addition Procedure for QoE Service in a wireless communication system.

In particular, FIG. 10 illustrates a diagram for triggering QoE service during the SN addition procedure.

In step S1000, the MN may transmit an initial context setup request message to the AMF and receive an initial context setup acknowledgement message from the AMF.

In step S1001, the MN may decide to request the target SN to allocate resources for one or more specific PDU Sessions/QOS Flows, indicating QoS Flows characteristics (Qos Flow Level QoS parameters, PDU session level TNL address information, and PDU session level Network Slice info).

In addition, for bearers requiring SCG radio resources, MN may indicate the requested SCG configuration information, including the entire UE capabilities and the UE capability coordination result.

In this case, the MN may also provide the latest measurement results for SN to choose and configure the SCG cell(s). The MN may request the SN to allocate radio resources for split SRB operation.

In NGEN-DC and NR-DC, the MN may always provide all the needed security information to the SN (even if no SN terminated bearers are setup) to enable SRB3 to be setup based on SN decision.

Based on the signalling load or other situation of MN, the MN may decide to let SN help the MN to perform some QoE services for this UE.

Thus, the request message (i.e., the SN addition request message) may include the indication(s) of requesting QoE configuration and/or QoE reporting in SN (for example, via existing or other SRB). The S-NG-RAN node may take it into account to configure radio resources for QoE configuration and/or QoE reporting via existing or other SRB.

The request message may also include at least one of the QoE related parameters (for example, QoE application layer measurement configuration, QoE areas (cell list, TAI list, and PLMN list), QoE service type, and/or QoE server IP address).

In step S1002, if the RRM entity in the SN is able to admit the resource request, it may allocate respective radio resources and, dependent on the bearer type options, respective transport network resources.

For bearers requiring SCG radio resources, the SN may trigger UE Random Access so that synchronisation of the SN radio resource configuration can be performed.

The SN may decide for the PSCell and other SCG SCells and provide the new SCG radio resource configuration to the MN within an SN RRC configuration message contained in the SN Addition Request Acknowledge message.

In case of bearer options that require Xn-U resources between the MN and the SN, the SN may provide Xn-U TNL address information for the respective DRB, Xn-U UL TNL address information for SN terminated bearers, Xn-U DL TNL address information for MN terminated bearers. For SN terminated bearers, the SN may provide the NG-U DL TNL address information for the respective PDU Session and security algorithm.

If SCG radio resources have been requested, the SCG radio resource configuration may be provided.

Based on the signalling load or other situation of SN, SN can decide whether to accept the request from MN on QoE services for this UE.

The response message (i.e., the SN edition request acknowledge message) may include the response indication(s) on whether the requested QoE configuration and/or QoE reporting in SN (for example, via existing or other SRB) is accepted or not.

If yes (that is, if the QoE request from the MN is accepted by the SN), the requested QoE configuration and QoE reporting will be done in SN. It may include the indication to tell MN and/or it may include the indication and/or information in the RRC context to let UE know that QoE configuration and/or QoE reporting can be directly from/to SN.

If no (that is, if the QoE request from the MN is not accepted by the SN), it includes the indication to tell MN that the requested QoE configuration and/or QoE reporting in SN is not accepted. Thus, MN may need to perform QoE configuration and/or QoE reporting by itself using the existing or other SRB.

In step S1002a, for SN terminated bearers using MCG resources, the MN may provide Xn-U DL TNL address information in the Xn-U Address Indication message.

In step S1003, the MN may send the MN RRC reconfiguration message to the UE including the SN RRC configuration message.

If yes in step S1002, the received information (that is, the indication/information in the RRC context to let UE know that QoE configuration and/or QoE reporting can be directly from/to SN) may be passed to UE.

If no in step S1002, the MN may decide to do it by itself. It may include the measConfigAppLayerContainer, which contains configuration of application layer measurements, and also service type. QoE areas (for example, cell list, TAI list, and PLMN list) may be also included.

In step S1004, the UE may apply the new configuration and reply to MN with the MN RRC reconfiguration complete message, including an SN RRC response message for SN, if needed. UE will perform the corresponding QoE services.

In case the UE is unable to comply with (part of) the configuration included in the MN RRC reconfiguration message, the UE may perform the reconfiguration failure procedure.

In step S1005, the MN may inform the SN that the UE has completed the reconfiguration procedure successfully via the SN Reconfiguration Complete message, including the SN RRC response message, if received from the UE.

In step S1006, if configured with bearers requiring SCG radio resources, the UE may perform synchronisation towards the PSCell configured by the SN. The order the UE sends the MN RRC reconfiguration complete message and performs the Random Access procedure towards the SCG may be not defined. The successful RA procedure towards the SCG may be not required for a successful completion of the RRC Connection Reconfiguration procedure.

In step S1007, if PDCP termination point is changed to the SN for bearers using RLC AM, and when RRC full configuration is not used, the MN may send the SN Status Transfer.

In step S1008, for SN terminated bearers or QoS flows moved from the MN, dependent on the characteristics of the respective bearer or QoS flow, the MN may take actions to minimise service interruption due to activation of MR-DC (Data forwarding).

In steps S1009-S1012, if applicable, the update of the UP path towards the 5GC may be performed via a PDU Session Path Update procedure.

Figure 11:
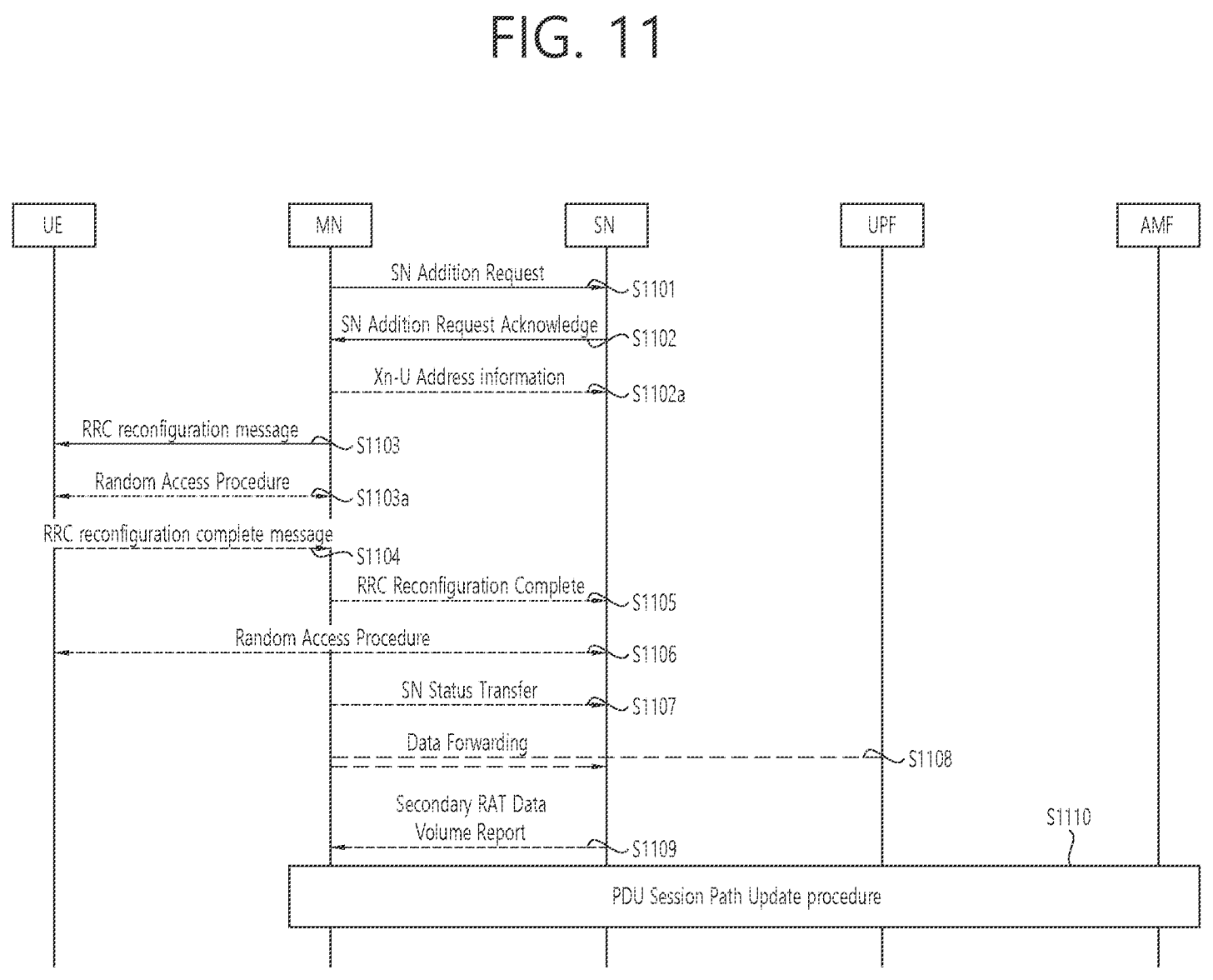

FIG. 11 shows an example of a SN Modification procedure for QoE Service in a wireless communication system.

In particular, FIG. 11 illustrates a diagram for triggering and/or releasing QoE service during the SN Modification procedure.

In this example, the MN may use the procedure to initiate configuration changes of the SCG within the same SN, including addition, modification or release of the user plane resource configuration. The MN may use this procedure to perform handover within the same MN while keeping the SN, when the SN needs to be involved (i.e. in NGEN-DC). The MN may also use the procedure to query the current SCG configuration, for example, when delta configuration is applied in an MN initiated SN change. The MN may also use the procedure to provide the S-RLF related information to the SN or to provide additional available DRB IDs to be used for SN terminated bearers.

The MN may not use the procedure to initiate the addition, modification or release of SCG SCells. The SN may reject the request, except if it concerns the release of the user plane resource configuration, or if it is used to perform handover within the same MN while keeping the SN.

Referring to FIG. 11, in step S1101, the MN may send the SN Modification Request message, which may contain user plane resource configuration related or other UE context related information, PDU session level Network Slice info and the requested SCG configuration information, including the UE capabilities coordination result to be used as basis for the reconfiguration by the SN. In case a security key update in the SN is required, a new SN Security Key is included.

In step S1101-1, based on the signalling load or other situation of MN, MN may decide to let SN help it to perform some QoE services for this UE.

In this case, the request message (that is, the SN Modification Request message) may include the indication(s) of requesting QoE configuration and/or QoE reporting in SN (for example, existing or other SRB). The S-NG-RAN node may take it into account to configure radio resources for QoE configuration and/or QoE reporting via existing or other SRB.

The request message (that is, the SN Modification Request message) may also include the QoE related parameters (for example, QoE application layer measurement configuration, QoE areas (cell list, TAI list, and PLMN list), QoE service type, and QoE server IP address).

In step S1101-2, based on the signalling load or other situation of MN, MN may decide to release the QoE services in SN for this UE.

In this case, request message (that is, the SN Modification Request message) may the indication(s) of releasing the previous requested QoE configuration and/or QoE reporting in SN (for example, existing or other SRB). The S-NG-RAN node may use it to release the radio resources for QoE configuration and/or QoE reporting via existing or other SRB.

In step S1102, the SN may respond with the SN Modification Request Acknowledge message, which may contain new SCG radio configuration information within an SN RRC reconfiguration message, and data forwarding address information (if applicable).

In step S1102-1, in the response message (that is, the SN Modification Request Acknowledge message), it may include the response indication(s) on whether the requested QoE configuration and/or QoE reporting in SN (for example, via existing or other SRB) is accepted or not.

If yes, the requested QoE configuration and QoE reporting will be done in SN, it may include the indication to tell MN, and/or it may include the indication/information in the RRC context to let UE know that QoE configuration and/or QoE reporting can be directly from/to SN.

If no, it may include the indication to tell MN that the requested QoE configuration and/or QoE reporting in SN is not accepted. Thus, MN may need to perform QoE configuration and/or QoE reporting by itself using the existing or other SRB.

In step S1102-2, in the response message, it may include the response on whether the releasing of the previous requested QoE configuration and/or QoE reporting in SN (for example, existing or other SRB) is done or not.

For example, for MN terminated bearers to be setup for which PDCP duplication with CA is configured in NR SCG side, the MN allocates up to 4 separate Xn-U bearers and the SN provides a logical channel ID for primary or split secondary path to the MN.

For SN terminated bearers to be setup for which PDCP duplication with CA is configured in NR MCG side, the SN allocates up to 4 separate Xn-U bearers and the MN provides a logical channel ID for primary or split secondary path to the SN via an additional MN-initiated SN modification procedure.

In step S1102a, when applicable, the MN may provide data forwarding address information to the SN. For SN terminated bearers using MCG resources, the MN may provide Xn-U DL TNL address information in the Xn-U Address Indication message.

In steps S1103 and S1104, the MN may initiate the RRC reconfiguration procedure, including an SN RRC reconfiguration message.

The UE may apply the new configuration, synchronize to the MN (if instructed, in case of intra-MN handover) and reply with the MN RRC reconfiguration complete message, including an SN RRC response message, if needed. In case the UE is unable to comply with (part of) the configuration included in the MN RRC reconfiguration message, it may perform the reconfiguration failure procedure.

In step S1103-1, if yes in step S1102-1, the received information (that is, the indication/information in the RRC context to let UE know that QoE configuration and/or QoE reporting can be directly from/to SN) may be passed to UE.

If no in step S1102-1, the MN may include the measConfigAppLayerContainer, which contains configuration of application layer measurements, and also service type in the MN RRC reconfiguration message. QoE areas (cell list, TAI list, and PLMN list) may be also included in the MN RRC reconfiguration message.

In step S1103-2, for the case of step S1102-2, the release indication can be sent to UE to let UE know that QoE configuration and/or QoE reporting is to be released in SN. The information can be container format from SN or set by MN.

In step S1105, upon successful completion of the reconfiguration, the success of the procedure may be indicated in the SN Reconfiguration Complete message.

In step S1106, if instructed, the UE may perform synchronisation towards the PSCell of the SN as described in SN addition procedure. Otherwise, the UE may perform UL transmission after having applied the new configuration.

In step S1107, if PDCP termination point is changed for bearers using RLC AM, and when RRC full configuration is not used, the SN Status Transfer may take place between the MN and the SN (For example, FIG. 11 may depict the case where a bearer context is transferred from the MN to the SN).

In step S1108, if applicable, data forwarding between MN and the SN may take place (For example, FIG. 11 may depict the case where a user plane resource configuration related context is transferred from the MN to the SN).

In step S1109, the SN may send the Secondary RAT Data Usage Report message to the MN and includes the data volumes delivered to and received from the UE.

For example, the order the SN sends the Secondary RAT Data Usage Report message and performs data forwarding with MN may be not defined. The SN may send the report when the transmission of the related QoS flow is stopped.

In step S1110, if applicable, a PDU Session path update procedure may be performed.

Some of the detailed steps shown in the example of FIGS. 9, 10, and 11 may not be essential steps and may be omitted. In addition, steps other than the steps shown in FIGS. 9, 10, and 11 may be added, and the order of the steps may vary. Some of the above steps may have their own technical meaning.

Hereinafter, an apparatus for handling QoE management in dual connectivity in a wireless communication system, according to some embodiments of the present disclosure, will be described.

For example, a secondary node may include a processor, and a memory. The processor may be configured to be coupled operably with the memory.

The processor may be configured to receive, from a master node, a request message for a Quality of Experience (QoE) management for a UE. The processor may be configured to determine whether to perform the QoE management for the UE. The processor may be configured to transmit, to the master node, a response message based on the determination.

For example, the request message may include information on parameters related to the QoE management.

For example, the request message may include at least one of (1) application layer measurement configuration parameters for QoE, (2) information on QoE areas, (3) information on a QoE service type, and/or (4) a QoE server IP address. The information on the QoE area may include at least one of (1) a cell list, (2) a Tracking Area Identity (TAI) list, and/or (3) a Public Land Mobile Network (PLMN) list.

For example, the response message may include information informing whether to perform the QoE management for the UE.

For example, the response message may include a radio resource control (RRC) context including information informing that the QoE management for the UE is directly performed by the secondary node, based on determining to perform the QoE management. The RRC context may be forwarded to the UE via the master node.

According to some embodiments of the present disclosure, the processor may be configured to perform the QoE management, based on determining to perform the QoE management.

The processor may be configured to transmit, directly to the UE, a QoE configuration. The processor may be configured to receive, directly from the UE, a QoE reporting.

For example, the QoE management may be performed by one signalling radio bearer (SRB).

For example, the processor may be configured to receive, from the master node, a release request message for the QoE management for the UE on releasing the previous requested QoE configuration and QoE reporting. The processor may be configured to transmit, to the master node, a release response message informing whether the releasing of the QoE management for the UE is done or not.

According to some embodiments of the present disclosure, the request message may be a secondary node (SN) addition request message. The response message may be an SN addition request acknowledgement message.

According to some embodiments of the present disclosure, the request message may be a secondary node (SN) modification request message. The response message may be an SN modification request acknowledgement message.

According to some embodiments of the present disclosure, the UE may be in communication with at least one of a user equipment, a network, or an autonomous vehicle other than the UE.

Hereinafter, a processor for a secondary node for handling QoE management in dual connectivity in a wireless communication system, according to some embodiments of the present disclosure, will be described.

The processor may be configured to control the secondary node to receive, from a master node, a request message for a Quality of Experience (QoE) management for a UE. The processor may be configured to control the secondary node to determine whether to perform the QoE management for the UE. The processor may be configured to control the secondary node to transmit, to the master node, a response message based on the determination.

For example, the request message may include information on parameters related to the QoE management.

For example, the request message may include at least one of (1) application layer measurement configuration parameters for QoE, (2) information on QoE areas, (3) information on a QoE service type, and/or (4) a QoE server IP address. The information on the QoE area may include at least one of (1) a cell list, (2) a Tracking Area Identity (TAI) list, and/or (3) a Public Land Mobile Network (PLMN) list.

For example, the response message may include information informing whether to perform the QoE management for the UE.

For example, the response message may include a radio resource control (RRC) context including information informing that the QoE management for the UE is directly performed by the secondary node, based on determining to perform the QoE management. The RRC context may be forwarded to the UE via the master node.

According to some embodiments of the present disclosure, the processor may be configured to control the secondary node to perform the QoE management, based on determining to perform the QoE management.

The processor may be configured to control the secondary node to transmit, directly to the UE, a QoE configuration. The processor may be configured to control the secondary node to receive, directly from the UE, a QoE reporting.

For example, the QoE management may be performed by one signalling radio bearer (SRB).

For example, the processor may be configured to control the secondary node to receive, from the master node, a release request message for the QoE management for the UE on releasing the previous requested QoE configuration and QoE reporting. The processor may be configured to control the secondary node to transmit, to the master node, a release response message informing whether the releasing of the QoE management for the UE is done or not.

According to some embodiments of the present disclosure, the request message may be a secondary node (SN) addition request message. The response message may be an SN addition request acknowledgement message.

According to some embodiments of the present disclosure, the request message may be a secondary node (SN) modification request message. The response message may be an SN modification request acknowledgement message.

According to some embodiments of the present disclosure, the UE may be in communication with at least one of a user equipment, a network, or an autonomous vehicle other than the UE.

Hereinafter, a non-transitory computer-readable medium has stored thereon a plurality of instructions for handling QoE management in dual connectivity in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a secondary node.

The stored a plurality of instructions may cause the secondary node to receive, from a master node, a request message for a Quality of Experience (QoE) management for a UE. The stored a plurality of instructions may cause the secondary node to determine whether to perform the QoE management for the UE. The stored a plurality of instructions may cause the secondary node to transmit, to the master node, a response message based on the determination.

For example, the request message may include information on parameters related to the QoE management.

For example, the request message may include at least one of (1) application layer measurement configuration parameters for QoE, (2) information on QoE areas, (3) information on a QoE service type, and/or (4) a QoE server IP address. The information on the QoE area may include at least one of (1) a cell list, (2) a Tracking Area Identity (TAI) list, and/or (3) a Public Land Mobile Network (PLMN) list.

For example, the response message may include information informing whether to perform the QoE management for the UE.

For example, the response message may include a radio resource control (RRC) context including information informing that the QoE management for the UE is directly performed by the secondary node, based on determining to perform the QoE management. The RRC context may be forwarded to the UE via the master node.

According to some embodiments of the present disclosure, the stored a plurality of instructions may cause the secondary node to perform the QoE management, based on determining to perform the QoE management.

The stored a plurality of instructions may cause the secondary node to transmit, directly to the UE, a QoE configuration. The stored a plurality of instructions may cause the secondary node to receive, directly from the UE, a QoE reporting.

For example, the QoE management may be performed by one signalling radio bearer (SRB).

For example, the stored a plurality of instructions may cause the secondary node to receive, from the master node, a release request message for the QoE management for the UE on releasing the previous requested QoE configuration and QoE reporting. The stored a plurality of instructions may cause the secondary node to transmit, to the master node, a release response message informing whether the releasing of the QoE management for the UE is done or not.

According to some embodiments of the present disclosure, the request message may be a secondary node (SN) addition request message. The response message may be an SN addition request acknowledgement message.

According to some embodiments of the present disclosure, the request message may be a secondary node (SN) modification request message. The response message may be an SN modification request acknowledgement message.

According to some embodiments of the present disclosure, the UE may be in communication with at least one of a user equipment, a network, or an autonomous vehicle other than the UE.

The present disclosure may have various advantageous effects.

According to some embodiments of the present disclosure, a RAN node could efficiently handle QoE management in dual connectivity.

For example, either a master node or a secondary node could perform QoE configuration and/or QoE reporting. Therefore, the conflict problem for deciding which node is in charge the QoE service can be solved. This will be helpful for supporting the QoE services in the important MR-DC deployment scenarios.

For example, the user experience for various services (for example, AR/VR, URLLC) could be enhanced.

According to some embodiments of the present disclosure, the wireless communication system could support QoE management efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method, comprising,
receiving, by a secondary node from a master node, a request message for a Quality of Experience (QoE) management for a User Equipment (UE),
wherein the request message includes (i) a QoE configuration for the UE and (ii) information related to parameters related to the QoE management;
determining, by the secondary node, that the secondary node performs the QoE management for the UE;
transmitting, by the secondary node to the master node, a response message including a radio resource control context,
wherein the radio resource control context includes information informing that the QoE management for the UE is directly performed by the secondary node;
transmitting, by the secondary node directly to the UE, the QoE configuration; and
receiving, by the secondary node directly from the UE, a QoE report.

2. The method of claim 1, wherein the request message includes at least one of (1) application layer measurement configuration parameters for QoE, (2) information on QoE areas, (3) information on a QoE service type, and/or (4) a QoE server IP address.

3. The method of claim 2, wherein the information on the QoE area includes at least one of (1) a cell list, (2) a tracking area identity list, and/or (3) a public land mobile network list.

4. The method of claim 1, wherein the method further comprises,
performing, by the secondary node, the QoE management, based on determining to perform the QoE management.

5. The method of claim 1,
wherein the QoE management is performed via a single signalling radio bearer.

6. The method of claim 1, wherein the method further comprises,
receiving, by the secondary node from the master node, a release request message for releasing the previous requested QoE configuration and QoE reporting.

7. The method of claim 6, wherein the method further comprises,
transmitting, by the secondary node to the master node, a release response message informing whether the releasing of the QoE management for the UE is done or not.

8. The method of claim 1,
wherein the request message is a secondary node addition request message; and
wherein the response message is a secondary node addition request acknowledgement message.

9. The method of claim 1,
wherein the request message is a secondary node modification request message; and
wherein the response message is a secondary node modification request acknowledgement message.

10. The method of claim 1, wherein the UE is in communication with at least one of a user equipment, a network, or an autonomous vehicle other than the UE.

11. A secondary node, comprising:
a memory; and
at least one processor operatively coupled to the memory, and configured to perform operations, the operations comprising:
receiving, from a master node, a request message for a Quality of Experience (QoE) management for a User Equipment (UE);
wherein the request message includes (i) a QoE configuration for the UE and (ii) information related to parameters related to the QoE management;
determining that the secondary node performs the QoE management for the UE;
transmitting, to the master node, a response message including a radio resource control context,
wherein the radio resource control context includes information informing that the QoE management for the UE is directly performed by the secondary node;
transmitting, directly to the UE, the QoE configuration; and
receiving, directly from the UE, a QoE report.

12. The secondary node of claim 11, wherein the request message includes at least one of (1) application layer measurement configuration parameters for QoE, (2) information on QoE areas, (3) information on a QoE service type, and/or (4) a QoE server IP address.

13. The secondary node of claim 12, wherein the information on the QoE area includes at least one of (1) a cell list, (2) a tracking area identity list, and/or (3) a public land mobile network list.

* * * * *